United States Patent [19]

Prasad et al.

[11] Patent Number: 5,169,412
[45] Date of Patent: Dec. 8, 1992

[54] MEMBRANE AIR DRYING AND SEPARATION OPERATIONS

[75] Inventors: Ravi Prasad, East Amherst; Frank Notaro, Amherst, both of N.Y.

[73] Assignee: Praxair Technology Inc., Danbury, Conn.

[21] Appl. No.: 794,911

[22] Filed: Nov. 20, 1991

[51] Int. Cl.⁵ ............................................. B01D 53/22
[52] U.S. Cl. ............................................ 55/16; 55/68; 55/158
[58] Field of Search ..................... 55/16, 68, 158

[56] References Cited

U.S. PATENT DOCUMENTS

| | | | |
|---|---|---|---|
| 3,144,313 | 8/1964 | Pfefferle | 55/158 X |
| 3,339,341 | 9/1967 | Maxwell et al. | 55/16 |
| 4,119,417 | 10/1978 | Heki et al. | 55/158 |
| 4,140,499 | 2/1979 | Ozaki et al. | 55/158 |
| 4,701,187 | 10/1987 | Choe et al. | 55/16 |
| 4,894,068 | 1/1990 | Rice | 55/16 |
| 4,931,070 | 6/1990 | Prasad | 55/16 |
| 4,934,148 | 6/1990 | Prasad et al. | 55/16 X |
| 4,964,886 | 10/1990 | Brugerolle et al. | 55/158 X |
| 5,004,482 | 4/1991 | Haas et al. | 55/16 |
| 5,013,437 | 5/1991 | Trimmer et al. | 55/16 X |
| 5,084,073 | 1/1992 | Prasad | 55/158 X |

FOREIGN PATENT DOCUMENTS

| | | |
|---|---|---|
| 0390392 | 10/1990 | European Pat. Off. |
| 63-065930 | 3/1988 | Japan ..................... 55/158 |
| 02-307804 | 12/1990 | Japan ..................... 55/158 |

*Primary Examiner*—Robert Spitzer
*Attorney, Agent, or Firm*—Alvin H. Fritschler

[57] ABSTRACT

Clean, dry air and nitrogen product gas are produced in an integrated system including an air separation membrane system and a membrane dryer operated with a significant degree of countercurrency of performance. Waste or recycle streams from the air separation membrane are used as purge in the membrane dryer.

30 Claims, 3 Drawing Sheets

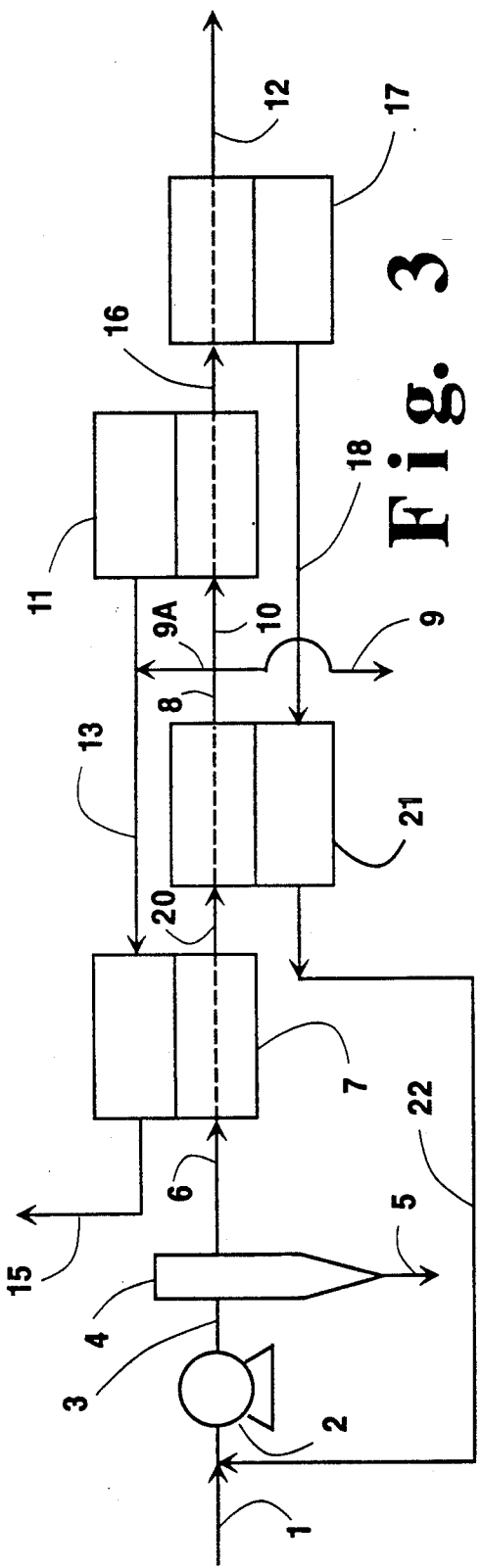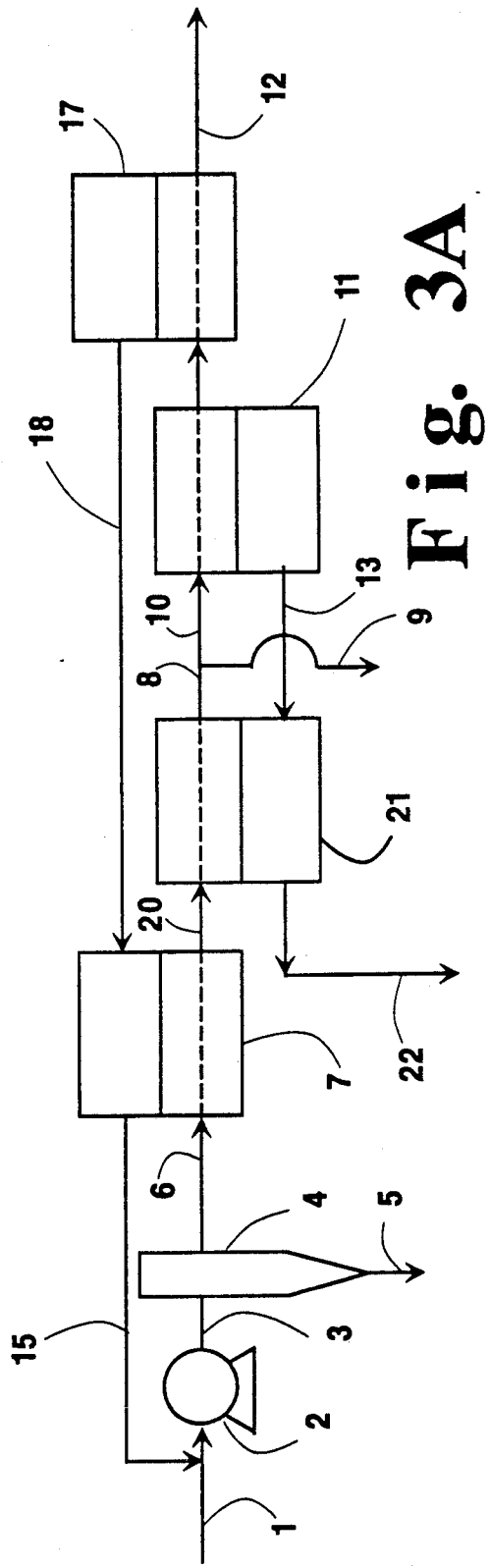

MEMBRANE AIR DRYING AND SEPARATION OPERATIONS

BACKGROUND OF THE INVENTION

1. Field of the Invention

The invention relates to air drying and separation operations. More particularly, it relates to the production of both dry air and nitrogen products.

2. Description of the Prior Art

Permeable membrane processes and systems have been proposed and used increasingly for the production of nitrogen by air separation. In such operations, feed air is brought into contact with the surface of the membrane, and oxygen, as the more readily permeable component of air, passes through the membrane while nitrogen, the less readily permeable component of air, is withdrawn from the membrane system as a non-permeate product stream. Conventional membrane systems typically produce nitrogen having Purity levels of up to about 99.5%. Higher nitrogen purities can be achieved if a post-purification feature is employed. Such processing may also include the use of a countercurrent membrane dryer with permeate gas from an air separation membrane being employed as purge gas in the dryer membrane. In some industrial operations, a source of clean, dry compressed air is also desired to prevent corrosion and condensation in instrumentation, piping, pneumatic tools, ventilators and other plant operations. For such latter purposes, separate adsorptive or refrigerative dryers have typically been utilized. Such units, however, tend to have significant product losses, due to purge and blowdown steps, or generally require a significant expenditure of added energy, e.g. for regeneration or refrigeration.

The ability of various membrane materials to permeate moisture is well known in the art. Thus, a membrane system utilizing such a material would be used to replace the function of the adsorptive (or regenerative) dryer for producing clean, dry air for such variety of purposes. However, many practical commercial asymmetric and composite-type membranes are characterized by the crossflow permeation model performance, wherein the composition of the bulk gas on the permeate side of the membrane has little effect on the permeation rates achieved. Accordingly, the removal of moisture from compressed air streams by means of such membranes requires the co-permeation of significant amounts of valuable product gas as well. Operation at stage cuts, i.e., the permeate to feed flow ratio, on the order of 10% to 30% might be required to achieve the dew points typically Provided by adsorptive or refrigerative dryers. As a result, the substitution of crossflow-type membrane dryers to produce clean, dry compressed air is not economically attractive.

Advances in membrane product development and theory have resulted in the recognition in the art that some composite and asymmetric membranes are characterized by a significant degree of countercurrency in operation, and thus follow, at least in part, the countercurrent permeation mathematical model of the art rather than the crossflow model. Membranes designed so that permeation therethrough to a significant extent can be described by the countercurrent model can benefit from the use of purge gas on the low pressure permeate side of the membrane. It is possible, in such circumstances, to achieve lower stage cuts to achieve the same moisture removal level as in crossflow permeation designs, provided that dry purge gas is available at the job site.

While the membrane drying art has thus progressed and membrane air separation systems have been employed in commercial operations, it is desirable to achieve further advances in the art, Particularly in light of the ever increasing performance requirements applicable to membrane systems in satisfying the needs of industrial applications. In particular, it is desirable in the art that membrane systems be provided for the enhanced integration of membrane air separation and air drying applications.

It is an object of the invention to provide improved air treatment membrane systems and processes.

It is another object of the invention to provide membrane systems and processes suitable to provide both air separation and air drying operations.

It is a further object of the invention to provide improved membrane systems and processes for the production of both nitrogen product and dry air.

With these and other objects in mind, the invention is hereinafter described in detail, the novel features thereof being particularly pointed out in the appended claims.

SUMMARY OF THE INVENTION

A countercurrent membrane dryer is used to produce a clean, dry compressed air stream, a portion of which is used as product, while the remainder is passed to a membrane air separation system for the production of nitrogen product. If the membrane air separation system is relatively insensitive to the presence of water vapor, saturated feed air may be split into two streams, with one stream being the feed gas to a two stage, air separation membrane system and the other stream being passed to the membrane dryer. The permeate from the second stage of the air separation membrane system can be used as reflux purge for the membrane dryer and recycled, if desired, to the inlet to the feed air compressor.

BRIEF DESCRIPTION OF THE DRAWINGS

The invention is hereinafter described in detail with respect to the accompanying drawings in which:

FIG. 3 is a schematic flow diagram of an embodiment of the invention using a two stage membrane dryer and a two stage air separation system for the production of dry air and nitrogen product;

FIG. 3A represents an alternative arrangement of the embodiment of the invention illustrated in FIG. 3.

DETAILED DESCRIPTION OF THE INVENTION

Figure 1:
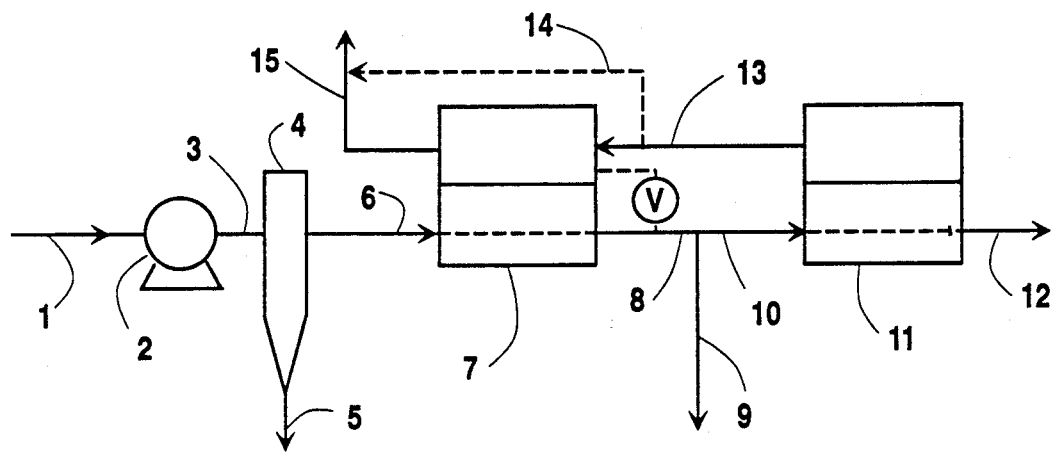
FIG. 1 is a schematic flow diagram of an embodiment of the invention for producing clean dry air and nitrogen using a single stage membrane dryer and a single stage membrane air separation system.

The objects of the invention are accomplished by the use of a hybrid membrane separation system that produces both clean dry air and moderate purity nitrogen product. A membrane dryer characterized by a high permeability for water relative to air, i.e. a high separation factor or selectivity, is used to produce clean dry air. A portion of this clean dry air is withdrawn as product, while the remainder is used as the feed gas to a membrane air separation system. Part of the relatively dry permeate gas from the air separation system can be used as reflux purge gas to sweep away permeating moisture in the membrane dryer.

For membrane air separation systems for nitrogen production in which the membrane material is relatively insensitive to the pressure of water vapor, the saturated compressed feed air to the overall system can be split into two streams. One such stream is passed to a membrane air separation system comprising two membrane stages, while the other stream is passed to the membrane dryer. The permeate gas from either the first or second stage of the air separation unit can be used as purge gas for the membrane dryer, and said second stage permeate can then, if desired, be recycled to the inlet of the feed air compressor for the system.

The membrane selected for the dryer should be characterized by a high water separation factor, i.e. ratio of the permeability of water to air, of at least 50, preferably greater than 1,000, for advantageous moisture removal from air. In addition, the membrane should have a relatively low permeability rate for air, i.e. for nitrogen and oxygen. Cellulose acetate is a representative example of a suitable membrane material for such purpose. However, various other materials, such as ethyl cellulose, silicone rubber, polyurethane, polyamide, polystyrene and the like can also be employed.

The membrane dryer is operated with a countercurrent flow pattern. As indicated above, in preferred hollow fiber membrane configurations or in other such configurations, e.g. spiral wound, bundle designs providing for cross-flow type flow patterns have been commonly employed. In such cross-flow operation the flow of permeate gas on the permeate side of the membrane is at right angles to the flow of feed air on the feed side of the membrane. Using hollow fiber bundles with the passage of feed gas on the outside of the hollow fiber membranes, the flow direction of permeate in the bores of the fibers is generally at right angles to the flow of feed over the external surface of the hollow fibers. Using the inside-out approach in which the feed gas is passed through the bores of the hollow fibers, the permeate gas generally passes from the surface of the hollow fibers in a direction generally at right angles to the direction of the flow of feed within the bores of the hollow fibers and then, within the outer shell of the membrane module, in the direction of the outlet means for the permeate gas. As shown in European patent application Publication No. 0 226 431, published Jun. 24, 1987, countercurrent flow patterns can be created by encasing the hollow fiber bundle within an impervious barrier over the entirety of its longitudinal outer surface except for a non-encased circumferential region to enable feed gas or permeate gas, depending on whether outside-in or inside-out operation is employed, to pass in countercurrent flow outside the hollow fibers parallel to the direction of permeate gas or feed gas in the bores of the hollow fibers.

It will be understood that the membrane fibers may be organized either in straight assemblies parallel to the central axis of the bundle, or alternatively, can be wound in helical fashion around the central axis. In any event, the impermeable barrier material may be a wrap of impervious film, e.g. polyvinylidene or the like. Alternatively, the impermeable barrier may be an impervious coating material, e.g. polysiloxane, applied from an innocuous solvent, or a shrink sleeve installed over the membrane bundle and shrunk onto said bundle. The impermeable barrier thus encases the hollow fiber or other membrane bundle and, as disclosed in said publication, has an opening therein permitting the flow of gas into or from the bundle so that the fluid flows in a direction substantially parallel to the axis of the fiber bundle. For purposes of the invention, the flow pattern should be one of countercurrent flow of the feed air to be dried and the permeate gas comprising purge gas and the moisture together with other gases that selectively permeates through the membrane material in the membrane dryer. Relatively dry purge gas, preferably a portion of the relatively dry permeate from the air separation membrane system, either the first stage permeate or the second stage permeate in various aspects of the invention in which a two-stage membrane air separation system is employed for the desired production of nitrogen product, is used to purify the permeate side of the membrane dryer.

In the FIG. 1 embodiment of the invention, a single stage air dryer and a single stage air separation system are employed. Permeate from the air separation membrane is used as purge on the low pressure permeate for the air dryer membrane. In this embodiment, feed air is passed in line 1 to feed air compressor 2 from which compressed air is passed in line 3 to moisture separator 4, from which water is removed through line 5. The feed air is passed therefrom through line 6 to the feed side of single stage membrane dryer 7 for the selective permeation of moisture therefrom. Dry, non-permeate air is removed from membrane dryer 7 through line 8 and is divided into two separate gas streams. One stream is removed from the system through line 9 as a clean, dry air product stream, while the other is passed through line 10 to single stage air separation system 11 for the production of nitrogen product. The nitrogen product is recovered from the system through line 12. The more selectively permeable oxygen permeates the membrane of said system 11 and is withdrawn therefrom through line 13 for use as purge gas on the low pressure, permeate side of membrane dryer 7. As shown in the drawing, a portion of said dry oxygen purge gas can be diverted through line 14 so as not to pass through said membrane dryer 7 in the event that all of the permeate from air separation system 11 is not needed for membrane dryer purge purposes. Likewise, as shown in FIG. 1, a portion of the clean, dry air removed as non-permeate gas from membrane dryer 7 can be recycled to the product end of said dryer 7, in the permeate side thereof, for use as purge gas therefor. The permeate gas from membrane dryer 7, comprising wet waste gas, is removed from the system through line 15.

Figure 2:
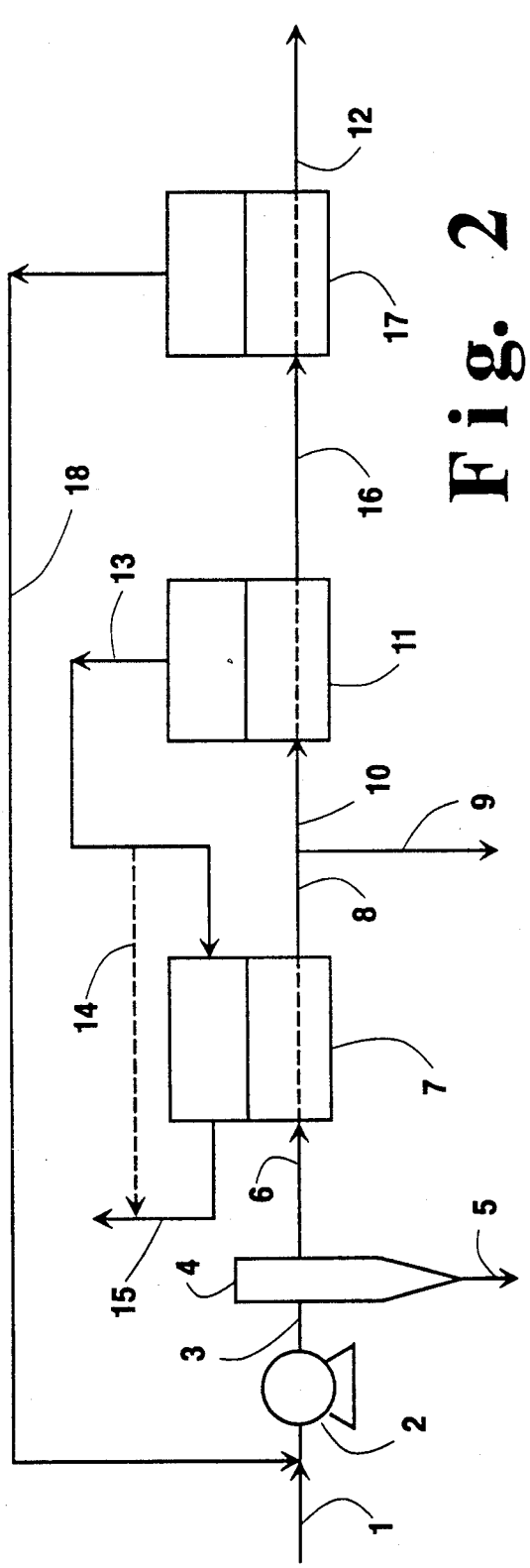
FIG. 2 is a schematic flow diagram of an embodiment of an invention for combined dry air and nitrogen production wherein a single stage membrane dryer and a two stage membrane air separation system are employed.

The embodiment of FIG. 1 is particularly suited where clean dry air and nitrogen of relatively low purity, i.e. less than or equal to about 97%, is required. For higher product nitrogen purity, a two stage nitrogen membrane system is usually desirable. For such cases, the permeate from either the first or second stage of the membrane air separation system may be used to reflux the low pressure permeate side of a typically single stage membrane dryer. Such an embodiment is illustrated in FIG. 2, in which the first stage permeate is used for membrane dryer purge, and in FIG. 2A in which the second stage permeate is used as membrane dryer purge.

In the FIG. 2 embodiment, the system is the same as in FIG. 1, and is numbered as in FIG. 1 other than as indicated hereinbelow. Thus non-permeate gas passes from first stage 11 of the membrane air separation system through line 16 to the feed side of second stage air separation membrane from which the product nitrogen is recovered through line 12. The additional oxygen enriched stream that selectively permeates said second stage 17 is desirably recycled through line 18 to line 1 for passage, together with additional quantities of feed air, to membrane dryer 7, and subsequently to the membrane nitrogen system, for recovery of additional quantities of nitrogen therefrom.

Figure 2A:
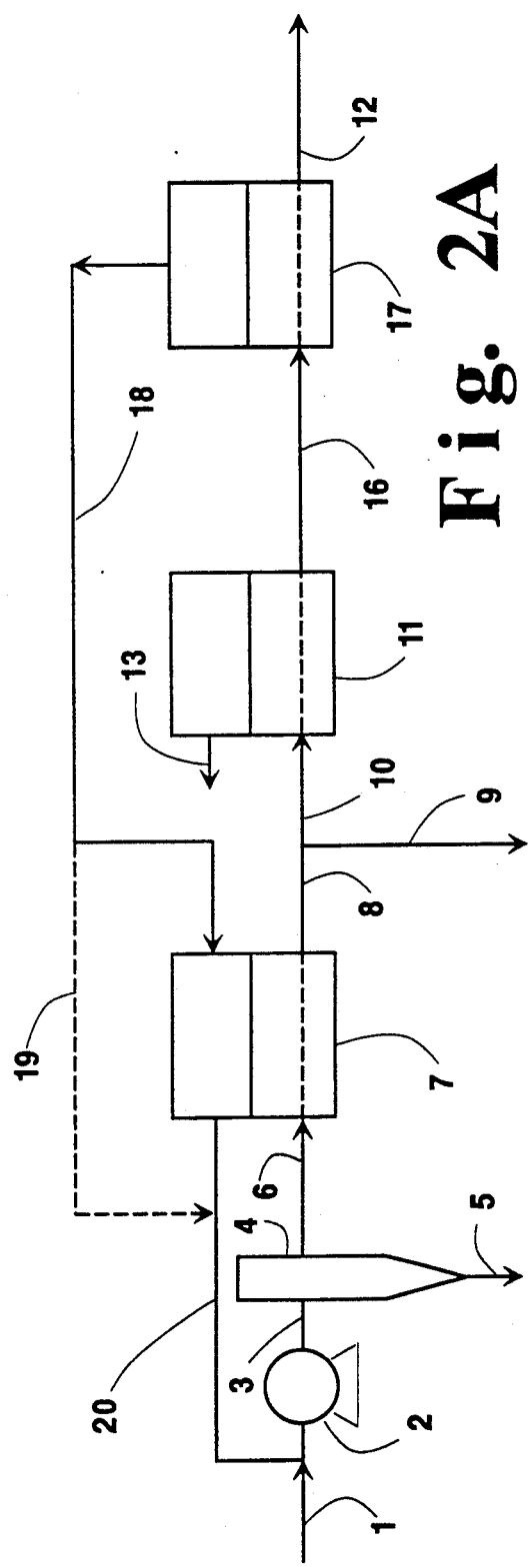
FIG. 2A represents an alternative arrangement of the embodiment of the invention illustrated in FIG. 2.

In the FIG. 2A embodiment, the second stage permeate gas passes in line 18 to the low pressure permeate side of membrane dryer 7 for use as purge gas therein, with the purge and permeate gas from membrane dryer 7 being recycled in line 20 back to line 1 for compression and passage to membrane dryer 7. A portion of the second stage permeate may by-pass membrane dryer 7, as by passage through line 19 directly to line 20. In this embodiment, the permeate gas withdrawn from first stage permeate 11 through line 13 constitutes the waste gas stream of the overall system.

It is also within the scope of the invention to employ a two stage membrane dryer as well as a two stage air separation system. In the FIG. 3 embodiment, feed air is processed in the manner shown in FIG. 2 except that the partially dried feed air removed from first stage membrane dryer 7 passes in line 20 to second stage membrane dryer 21 from which dry air is discharged in line 8. A portion of said dry air is passed in line 10 to the feed end of first stage air separation membrane 11, while the remaining portion of said dry air is recovered through line 9 as a clean dry air product. As in the FIG. 2 embodiment, the non-permeate gas from the first stage air separation membrane 11 is passed through line 16 to second stage air separation membrane 17 from which product nitrogen is recovered in line 12.

In the FIG. 3 embodiment, the oxygen rich permeate gas from first stage air separation membrane 11 is passed in line 13 to the permeate side of first stage membrane dryer 7 for use as purge gas therein, with the purge and permeate gas from said first stage membrane dryer 7 being discarded as waste gas through line 15. The oxygen-containing permeate gas from second stage air separation membrane 17 is passed in line 18 to the permeate side of second stage membrane dryer 21. The permeate gas and purge gas removed from said second stage membrane dryer 21 is recycled in line 22 to line 1 for compression and passage to first stage membrane dryer 7 together with additional quantities of feed air.

As will be seen from FIG. 3, the use of a two stage membrane dryer allows the use of the more dry permeate from the second stage of the air separation membrane to reflux the second stage membrane dryer, while the permeate from the first stage of the air separation membrane refluxes the first stage of the membrane dryer. An alternative embodiment is shown in FIG. 3A, whereby the membrane stages are paired in a conjugate arrangement with the permeate from the second stage of the air separation membrane refluxing the first stage of the membrane dryer, while the permeate from the first stage of the air separation membrane refluxes the second stage of the membrane dryer. Thus, permeate gas, i.e. oxygen rich gas, from first stage air separation membrane 11 passes in line 13 to second stage membrane dryer 21, and the gas discharged therefrom in line 22 is removed as wet waste gas. The permeate gas, i.e. oxygen containing gas, from second stage air separation membrane 17 is passed in line 18 as purge gas to first stage membrane dryer 7, with the purge and permeate gas removed from first stage membrane dryer 7 being passed to line 1 for return to the system with additional quantities of feed air. If the quantity of nitrogen product required is quite small in comparison to the need for clean, dry air, then the quantity of purge gas available from the air separation membrane system would be small. In such circumstances, the purge requirement in the membrane dryer system would exceed the quantity of purge gas available from the air separation system. In such situations, a portion of the clean dry air recovered after processing in the membrane dryer can be expanded from the membrane dryer pressure and blended with permeate from the air separation membrane system, e.g. by passage through optional line 9A in FIG. 3, to provide the desired quantity of gas in the membrane dryer, provided that only clean dry air is required.

Figure 4:
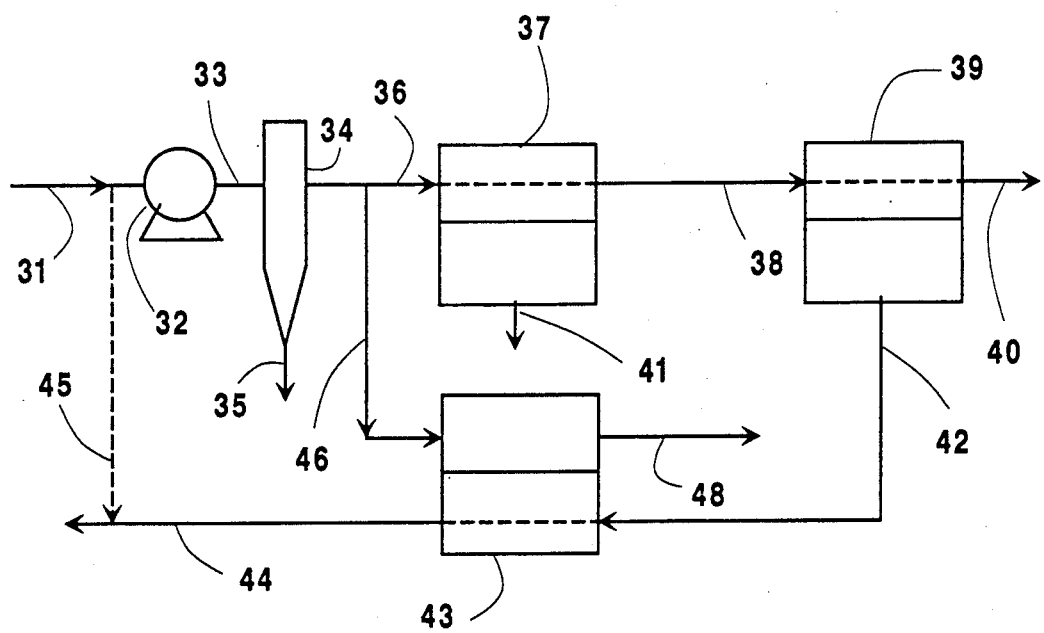
FIG. 4 is a schematic flow diagram of an embodiment of the invention for producing dry clean air and nitrogen product using moisture resistant membrane materials in the membrane air separation system.

In some applications wherein the membrane material employed in the air separation membrane is essentially moisture resistant, the use of saturated feed air therein has only a modest impact on the performance of the air separation membrane. If a two stage air separation membrane system is employed, the presence of water vapor may cause a slight, e.g. less than 15%, decrease in gas permeability for the first stage. In such cases, it is preferable to split the compressed saturated feed air stream into two streams as shown in FIG. 4. Thus, feed air in line 31 is passed to air compressor 32, from which compressed air is passed in line 33 to moisture separator 34, from which water is removed through line 35. The feed air is passed in line 36 to first stage air separation membrane 37 for the selective permeation of oxygen therefrom. The partially purified non-permeate nitrogen stream removed therefrom through line 38 is passed to second stage air separation membrane 39 from which product nitrogen is recovered as non-permeate gas through line 40.

A portion of the feed air in line 36 is diverted through line 46 for passage to membrane dryer 43, from which dry air product is recovered in line 48. Selectively permeable oxygen and moisture are removed from first stage air separation membrane 37 through line 41 for discard from the system. The permeate from second stage air separation membrane 39 is removed through line 42 and passed to the permeate side of membrane dryer 43 as purge gas to facilitate the desired drying of a portion of the feed air. The purge and permeate gas are removed from said dryer 43 through line 44 and can, optionally, be recycled through line 45 for passage, with additional quantities of feed air from line 31, to air compressor 32 and to the membrane dryer and membrane air separation systems. In general, it is desirable to recycle the nitrogen rich waste purge gas to the inlet of the feed compressor to boost the nitrogen recovery of the overall system. If the oxygen concentration of the dry air product recovered from membrane dryer 43 is of concern, however, the waste reflux purge and permeate from said dryer 43 can simply be vented from line 44.

The amount of reflux to the membrane dryer depends on a number of variables, including, but not necessarily limited to, the pressure ratio employed across the membrane, its selectivity or separation factor, the degree of countercurrency of performance achieved, the quantity of membrane area available per unit flowrate, the humidity of the reflux purge and the desired product and dew point. For a pressure dew point of $-40°$ F., at 100 psig feed, a purge ratio, i.e. reflux/total product air, of at least 15%, preferably 20% or above, is desired at a purge pressure of 15 psia to keep the membrane dryer surface area requirements and product loss to a minimum. It is generally desirable to keep the air loss due to co-permeation to less than 1%, and preferably to less than 0.5%, of the total product air flow.

The amount of reflux available also depends on a number of variables, such as the properties and staging of the membrane air separation system and the desired nitrogen product purity. The driest reflux will be the permeate from the second stage of the air separation membrane system, if a two stage system is employed, and the amount of this flow relative to that permeated in the first stage of the air separation membrane system will depend on the membrane surface area distribution between the two stages. In general, a purge of 30% to 70% of the feed air to the air separation membrane system will be available from all sources. It should be noted that the ratio of available purge to the total feed air in the membrane dryer will be somewhat lower depending on the fraction recovered as clean dry air product. As those skilled in the art will appreciate, the membrane geometry should desirably be optimized to keep the pressure drop on both the high and low pressure sides of the membrane dryer within acceptable levels.

The use of a membrane dryer to produce clean dry air for both plant use and as feed for an air separation membrane is feasible, from a practical commercial viewpoint, if the membrane dryer is operated, as indicated above, with a significant degree of countercurrency of permeation in contrast to the common approach of employing a cross-flow permeator. A relatively dry gas stream in the form of permeate from the air separation membrane system is available as reflux purge for the low pressure permeate side of the membrane dryer. In the simplest embodiment of the invention as shown in FIG. 1 of the drawing, the permeate from the single stage air separation system is used to reflux the low pressure side of the membrane dryer. The amount of clean dry air that can be produced by such a system depends on the membrane properties, the pressure ratio across the membrane dryer, the desired product air dryness, and the quantity and dryness of the available purge. Since membrane nitrogen processes typically operate at relatively high stage cuts, the quantity of available purge is usually large and, consequently, significant quantities of dry air product can generally be produced.

In an illustrative example of the practice of the invention using the FIG. 1 embodiment to produce 97% nitrogen at a pressure of 150 psig, the clean dry product of membrane dryer 7 can be split with half of the flow passing directly to plant use in line 9, and the other half being fed in line 10 directly to air separation membrane 11. Based on typical air separation membrane properties, a stage cut of roughly 60% might be required to produce the desired nitrogen purity. Thus, the nitrogen product flow in line 12 has a normalized value of 0.2, while the permeate flow available in line 13 for use as dryer reflux has a normalized value of 0.3. Thus, a purge-to-feed ratio of up to 30% is available for the membrane dryer Employing a membrane dryer operated to provide a significant degree of countercurrency as indicated above, with said membrane dryer having a typical water/air separation factor of 6,000 and a typical water permeability of 1,000 Barrers, the dryer membrane could readily produce a product air dew point of $-40°$ F. That is, the system of the invention would be able to provide 50% of the compressor flow as clean $-40°$ F. PDP (i.e., pressure dew point) air, and 20% as clean, dry 97% purity nitrogen product.

Those skilled in the art will appreciate that the quantity of product air lost as permeate in the membrane dryer should desirably be minimized. However, it should be noted that a portion of the actual operating loss is due to the rejection of water vapor and is thus unavoidable if a dry product is to be obtained. Therefore, it is the dry product loss resulting from co-permeation of air that should be minimized. For a membrane with the properties of selectivity and permeability indicated above, the dry product loss can be kept very low, e.g., to less than 0.5%, for purge ratios above about 15%. By contrast, a completely crossflow membrane would lose more than 20% of the dry product to achieve the same dew point level.

Because of its high permeability to moisture, the membrane dryer requires a small surface area relative to the membrane air separation system. In addition, the stage cut of the dryer will be much lower than that of the air separation membrane. As a result, the membrane system and the membrane bundle geometry should be arranged, in accordance with conventional practice in the art, so that the pressure drop of both the purge and product flows are kept to reasonable levels.

When higher product nitrogen purities are desired, a two stage air separation membrane is desirably employed. As seen from the description above and from FIGS. 2 and 2A of the drawings, permeate from either the first or second stage of the air separation membrane can be used to reflux the low pressure side of a single stage membrane dyer. If clean air of modest dew point is desired, the permeate from first stage of the two stage system is advantageously used as reflux. However, since the bulk of the moisture remaining in the dry air fed to the air separation membrane will be rejected in the first stage permeate, this reflux stream will have a higher moisture content than the second stage permeate. The second stage permeate is thus a more effective purge stream. The quantity of permeate available from this source is a function of the area distribution in the air separation membrane system and could be somewhat less than that available from the first stage. In this regard, it should be noted that the effectiveness of the second stage membrane as a recycle stream will be somewhat diluted since it will be blended with a greater quantity of feed air. In addition, this alternative configuration no longer produces clean dry air, but rather a clean dry air slightly enriched in nitrogen. For a given product nitrogen purity, the extent of this enrichment depends on the oxygen/nitrogen selectivity of the air separation membrane, the membrane surface area distribution of the two stage air separation membrane and on the clean dry gas to product nitrogen flow ratio. If such enrichment is disadvantageous for any reason, e.g., the air is to be used for breathing and/or ventilation purposes, the permeate need not be recycled. Alternatively, if the quantity of purge required is less than the permeate available, then the permeate stream can be split, with one portion by-passing the membrane dryer. After passing through the membrane dryer, the purge stream may be blended with the by-passed permeate and recycled to the head of the feed air compressor, as shown in FIG. 2A, or it can be vented from the system.

The FIG. 3 embodiment of the invention serves to maximize the amount of available purge and, due to the matching of driest purge to the final dryer stage, produces the lowest dew point. The alternative arrangement of FIG. 3A results in a somewhat higher dew point. It should be noted that both the FIG. 3 and the FIG. 3A embodiments result in a dilution of recycle effectiveness and/or a slight nitrogen enrichment of the dryer product.

In the FIG. 4 embodiment suitable in cases where the use of saturated feed air has only a modest impact on the performance of the air separation membrane, it is preferable to simply split the compressed saturated feed air into two streams as indicated above. The first stream is passed to the two stage air separation membrane, while the second stream is passed to the membrane dryer. The dryer is then refluxed by the relatively dry permeate from the second stage of the air separation membrane. In general, it is desirable to recycle the nitrogen rich waste purge from the membrane dryer to the inlet of the feed air compressor to boost the recovery of the air separation membrane system. However, if the oxygen purity of the dry air product is critical, the waste reflux purge of the membrane dryer may simply be vented rather than being recycled.

It will be appreciated that various changes and modifications can be made in the details of the process and system as herein described without departing from the scope of the invention as set forth in the appended claims. In this regard, it should be noted that membrane drying operations are commonly carried out using a dense fiber membrane. The thickness thereof is also the wall thickness, and is very large in comparison to the skin portion of an asymmetric membrane or to the separation layer of a composite membrane. Dense fibers have very low permeability rates and require the use of a very large surface area for adequate drying of the feed air. Asymmetric or composite membranes have very thin membrane separation layers, with the relatively more porous substrate portion of the membranes providing mechanical strength and support for the very thin portion that determines the separation characteristics of the membrane. Because of the inherently improved permeation fluxes obtainable by use of asymmetric or composite membranes, their use is preferred for the drying and air separation purposes of the invention, although dense fiber membranes can also be employed.

The membranes employed for the air separation purposes may comprise composites using a suitable membrane material, such as cellulose acetate or ethyl cellulose on a substrate, such as polysulfone; or asymmetric or dense membranes of one material, e.g. polysulfone, with the asymmetric membranes having two separate morphological regions, one comprising a thin, dense skin region and a less dense, porous support region, or variations thereof such as multicomponent membranes. While dense membranes are commonly used for product drying applications, the use of such dense membranes is not preferred because of the inherent limitations thereof. It will be understood that air separation membranes, capable of selectively permeating a more permeable component of feed air, generally comprise membrane materials capable of selectively permeating oxygen as the more readily permeable component, with nitrogen, as the less permeable component, being recovered as non-permeate. It is within the scope of the invention, however, to employ an air separation membrane system in which nitrogen is the more readily permeable component, and an oxygen rich stream is removed as the non-permeate stream.

As indicated above, the membrane dryer should be characterized by a significant degree of countercurrency. In this regard, countercurrency is the degree to which membrane performance approaches the countercurrent mathematical permeation model for the particular membrane. At 100% countercurrency, the membrane performance would be identical to that predicted by the countercurrent permeation model. At 0% countercurrency, membrane performance would be identical to the cross-flow permeation model. A significant degree of countercurrency, for purposes of the invention, is at least 10%, typically 20% or more. For such purposes, the membrane dryer should be operated in a countercurrent flow pattern as by the use of an impervious barrier over the longitudinal outer surface thereof except for a non-encased region for the desired flow of feed gas or permeate gas. In hollow fiber embodiments of the membrane dryer, this enables either inside-out or outside-in operation with countercurrent flow outside the hollow fibers parallel to the mean flow direction of permeate gas or feed gas in the bores of the hollow fibers. In the practice of the invention, therefore, the membrane dryer is not designed to provide flow patterns of the cross-flow type as have commonly been employed in commercial practice. In such cross-flow operation, the bulk flow direction of permeate gas on the permeate side of the membrane is at right-angles to the flow of feed gas on the feed side of the membrane. The use of a countercurrent flow pattern, together with the use of purge gas on the permeate side of the preferred hollow fiber membrane, or other configurations, enables the membrane performance to be characterized by a high degree of countercurrency as contrasted to membrane configurations adapted to follow the cross-flow mathematical model of membrane performance. In this regard, it should be understood that if the membrane dryer is configured so as to have a cross-flow type of flow pattern, i.e., by the positioning of openings in the membrane bundle to provide for bulk permeate flow on the permeate side at right angles to the flow of feed air on the feed side of the membrane, the overall membrane performance will be characterized by the cross-flow model of membrane performance regardless of other factors. It will also be understood that, for a membrane dryer having a significant degree of countercurrency of performance, i.e., a membrane that follows to the indicated extent the countercurrency model rather than the cross-flow model, further features can be employed to enhance the countercurrency of performance as may be desired for particular applications. Thus, while the membrane hollow fibers of the invention may be organized either in straight assemblies parallel to the central axis of the membrane bundle, or in helical fashion around the central axis, it is desirable to employ helical windings wound, as shown in the art, to provide uniform fiber lengths so as to provide for a uniform flow of gas through the fibers. In addition, the substrate portions of asymmetric or composite membranes can have a porosity such as to prevent concentration polarization across the substrate, with dense membranes inherently being free of such concentration polarization that precludes desired radial mixing across the substrate portion of the membrane. Furthermore, the purge ratio can be optimized for the subject drying operation. All of these features, outside the scope of the invention, can nevertheless be employed to enhance the countercurrency of membrane dryer performance, so as to achieve a high degree of countercurrency, i.e. at least about 50%, desirably above 80%, in highly advantageous embodiments.

The invention will be seen to provide a highly advantageous system and process for producing both clean dry air and nitrogen product gas. By such a hybrid membrane system and process, the highly desirable membrane technology is further advanced in efficiency and in convenient application to the air separation and air drying needs of practical commercial operations.

We claim:

1. A process for the production of clean, dry air and nitrogen products rom feed air comprising:
   (a) passing wet feed air to the feed end of a membrane dryer unit capable of selectively permeating moisture present in said feed air, said membrane dryer unit having a high separation factor for water/air and being adapted for a countercurrent flow pattern between the feed air and the permeate gas, with permeate gas flowing on the low pressure permeate side thereof generally parallel to the flow of wet feed air on the feed side thereof, said membrane dryer unit thereby being characterized by a significant degree of countercurrency of drying performance;
   (b) recovering a portion of the clean, dry air passing as non-permeate gas from the membrane dryer unit as a clean, dry air product stream;
   (c) passing the remaining portion of said clean, dry air from the membrane dryer unit to an air separation membrane system capable of selectively permeating oxygen or nitrogen as the more readily permeable component of air from feed air;
   (d) recovering a nitrogen product stream from the air separation membrane system;
   (e) passing oxygen containing gas from the air separation membrane system to the low pressure permeate side of the product end of the membrane dryer unit for use as purge gas therein;
   (f) discharging purge and permeate gas from the permeate side of the feed end of the membrane dryer unit as waste gas, whereby both clean, dry air and nitrogen product streams are efficiently obtained from feed air in said integrated membrane dryer unit and air separation membrane system.

2. The process of claim 1 in which oxygen is selectively permeated as the more readily permeable component of air, with nitrogen product being recovered as the less readily permeable component of air, with the oxygen containing gas passed from the air separation membrane system being passed from the low pressure permeate side thereof to the membrane dryer unit.

3. The process of claim 2 and including diverting a portion of oxygen rich gas passing to the membrane dryer unit directly to waste.

4. The process of claim 2 in which said air separation membrane system and said membrane dryer unit both comprise two-stage systems with the oxygen containing gas passing from the air separation membrane system to the membrane dryer unit being permeate gas from the first stage of the air separation membrane system to the low pressure permeate side of the product end of the first stage of the membrane dryer unit, and including passing permeate gas from the second stage of the air separation membrane system to the low pressure permeate side of the product end of the second stage of said membrane dryer unit, the purge and permeate gas discharged from the membrane dryer unit to waste being discharged from the permeate side of the feed end of the first stage of the membrane dryer unit, and including recycling purge and permeate gas from the second stage of the membrane dryer unit for introduction to the feed end of the first stage of said membrane dryer unit, with additional quantities of feed air.

5. The process of claim 2 in which said air separation membrane system and said membrane dryer unit both comprise two-stage systems in which oxygen containing gas being passed from the air separation membrane system to the membrane dryer unit comprises permeate gas from the first stage of the air separation membrane system to the low pressure permeate side of the product end of the second stage of the membrane dryer unit, and including passing permeate gas from the second stage of said air separation membrane system to the low pressure permeate side of the product end of the first stage of the membrane dryer unit, the purge and permeate gas discharged from the membrane dryer unit to waste comprising gas from the permeate side of the feed end of the second stage of the membrane dryer unit, and including recycling purge and permeate gas from the first stage of the membrane dryer unit for introduction to the feed end of the first stage of the membrane dryer unit.

6. The process of claim 2 in which said air separation system comprises a two-stage system, with oxygen containing gas being passed to the low pressure permeate side of the product end of the membrane dryer unit being oxygen rich gas passed from the first stage of the air separation membrane system, and including recycling permeate gas from the second stage of the air separation membrane system to the feed of the membrane dryer unit, together with additional quantities of feed air.

7. The process of claim 6 and including diverting a portion of the oxygen rich gas passing to the membrane dryer unit directly to waste.

8. The process of claim 2 in which said air separation membrane system comprises a two-stage system, with the oxygen containing gas passing to product end of the membrane dryer unit being oxygen containing gas passed from the second stage of the air separation membrane system, and including discharging permeate gas from the first stage of said air separation membrane system to waste, and including recycling permeate and purge gas from the feed end of the membrane dryer unit for introduction to the feed end of the membrane dryer unit with additional quantities of feed air.

9. The process of claim 8 and including diverting a portion of the oxygen containing gas passing to the membrane dryer unit for introduction to the feed end of the membrane dryer unit.

10. The process of claim 1 and including passing a portion of the clean, dry air removed from the product end of the membrane dryer unit to the permeate side of said membrane dryer unit for use as purge gas therein.

11. The process of claim 1 in which the membrane dryer unit comprises hollow fibers having an impervious barrier on the longitudinal outer surface thereof such as to provide for said countercurrent flow pattern between the feed air and the permeate gas.

12. A process for the production of clean, dry air and nitrogen from feed air comprising:
   (a) passing wet feed air to the feed end of a membrane dryer unit and of a first stage of an air separation membrane system, the membrane dryer unit being capable of selectively permeating moisture present in the feed air, said membrane dryer unit being characterized by a high separation factor for water/air and being adapted for a countercurrent flow pattern between the feed air and the permeate gas, with permeate gas flowing on the low pressure permeate side generally parallel to the flow of wet feed air on the feed side thereof, said membrane dryer unit thereby being characterized by a significant degree of countercurrency of drying performance, said air separation membrane system being capable of selectively permeating oxygen or nitrogen, as the more readily permeable component of air, the membrane material therein being relatively insensitive to the presence of water vapor in the feed air;
   (b) recovering clean, dry air from the product end of the membrane dryer unit as a clean, dry air product stream;
   (c) passing a partially purified nitrogen stream from the product end of the first stage of the air separation membrane system to the feed end of a second stage thereof;
   (d) discharging oxygen rich gas from the first stage of the air separation membrane system as a waste stream;
   (e) recovering a product nitrogen stream from the second stage of said air separation membrane system;
   (f) passing an oxygen-containing stream from the second stage of the air separation membrane system to the low pressure permeate side of the product end of said membrane drying unit for use as purge gas therein; and
   (g) removing purge and permeate gas from the feed end of the membrane dryer unit, whereby both clean, dry air and nitrogen product streams are efficiently obtained from feed air in said integrated membrane dryer unit and air separation membrane system.

13. The process of claim 12 in which said air separation membrane system is adapted for the selective permeation of oxygen as the more readily permeable component of air; with nitrogen product being recovered as the less readily permeable component of air, with the oxygen rich gas discharged from the first stage of the air separation membrane system comprising oxygen from the low pressure permeate side thereof, the oxygen-containing stream from the second stage of the air separation membrane system comprising said gas from the low pressure permeate side of the second stage of the air separation membrane system, with the product nitrogen stream being recovered as non-permeate gas from the product end of said second stage.

14. The process of claim 12 and including recycling purge and permeate gas removed from the feed end of the membrane dryer unit to the feed end of the membrane dryer unit and to the first stage of the air separation membrane system with additional quantities of feed air.

15. The process of claim 12 in which the membrane dryer unit comprises hollow fibers having an impervious barrier on the longitudinal outer surface thereof such as to provide for said countercurrent flow pattern between the feed air and the permeate gas.

16. A system for the production of clean, dry air and nitrogen products from feed air comprising:
   (a) a membrane dryer unit capable of selectively permeating moisture present in feed air, said membrane dryer unit being characterized by a high separation factor for water/air and being adapted for a countercurrent flow pattern between the feed air and the permeate gas, with bulk permeate gas flowing on the low pressure permeate side thereof generally parallel to the flow of wet feed air on the feed side thereof, said membrane dryer unit thereby being characterized by a significant degree of countercurrency of drying performance;
   (b) an air separation membrane system capable of selectively permeating oxygen or nitrogen, as the more readily permeable component of air, from feed air;
   (c) conduit means for passing wet feed air to the feed end of the membrane dryer unit;
   (d) conduit means for passing clean, dry air from the product end of the membrane dryer unit to the feed end of said air separation membrane system;
   (e) conduit means for recovering a portion of said clean, dry air removed from the membrane dryer unit as a clean, dry air product stream;
   (f) conduit means for recovering a nitrogen product stream from the air separation membrane system;
   (g) conduit means for passing oxygen containing gas from the air separation membrane system to the low pressure permeate side of the product end of the membrane dryer unit for use as purge gas therein; and
   (h) conduit means for discharging purge gas and permeate gas from the permeate side of the feed end of the membrane dryer unit as waste gas, whereby such integrated membrane dryer unit and air separation membrane system enable both clean, dry air and nitrogen product streams to be efficiently obtained from feed air.

17. The system of claim 16 in which said air separation membrane system is adapted for the selective permeation of oxygen as the more readily permeable component of air, with nitrogen product being recovered as the less readily permeable component of air, said conduit means for passing oxygen containing gas from the air separation membrane system being adapted to pass oxygen rich gas from the low pressure permeate side of said air separation system to the low pressure permeate side of the product end of said membrane dryer unit.

18. The system of claim 17 and including by-pass conduit means for diverting a portion of the oxygen rich gas passing to said membrane dryer unit directly to waste.

19. The system of claim 17 in which said air separation system comprises a two-stage system, with the conduit means for passing oxygen rich gas to the low pressure permeate side of the product end of the membrane dryer unit comprising conduit means from the first stage of the air separation membrane system, and including conduit means for recycling permeate gas from the second stage of said air separation membrane system for passage as feed gas together with additional quantities of feed air to said membrane dryer unit.

20. The system of claim 19 and including by-pass conduit means for diverting a portion of the oxygen rich gas passing to the membrane dryer unit directly to waste.

21. The system of claim 17 in which said air separation membrane system comprises a two-stage system, with the conduit means for passing oxygen rich gas to said product end of the membrane dryer unit comprising conduit means from the second stage of the air separation membrane system, and including conduit means for discharging permeate gas from the first stage of said air separation membrane system to waste, said conduit means for discharging purge gas and permeate gas from the feed end of the membrane dryer unit being adapted for recycling permeate and purge gas from the feed end of the membrane dryer unit for introduction to the feed end of the membrane dryer unit with additional quantities of feed air.

22. The system of claim 21 and including by-pass conduit means for diverting a portion of the second stage permeate passing to said membrane dryer unit for introduction to the feed end of the membrane dryer unit.

23. The system of claim 17 in which said air separation membrane system and said membrane dryer unit both comprise two-stage systems in which said conduit means for passing oxygen rich gas from the air separation membrane system to the membrane dryer unit comprises conduit means for passing permeate gas from the first stage of the air separation membrane system to the low pressure permeate side of the product end of the first stage of the membrane dryer unit, and including conduit means for passing permeate gas from the second stage of said air separation membrane system to the low pressure permeate side of the product end of the second stage of said membrane dryer unit, the conduit means for discharging Purge and permeate gas from the membrane dryer unit to waste comprising conduit means from the permeate side of the feed end of the first stage of the membrane dryer unit, and including conduit means for recycling purge and permeate gas from the second stage of the membrane dryer unit for induction to the feed end of the first stage of said membrane dryer unit.

24. The system of claim 17 in which said air separation membrane system and said membrane dryer unit both comprise two-stage systems in which said conduit means for passing oxygen rich gas from the air separation membrane system to the membrane dryer unit comprises conduit means for passing permeate gas from the first stage of the air separation membrane system to the low pressure permeate side of the product end of the second stage of the membrane dryer unit, and including conduit means for passing permeate gas from the second stage of said air separation membrane system to the low pressure permeate side of the product end of the first stage of the membrane dryer unit, the conduit means for discharging purge and permeate gas from the membrane dryer unit to waste comprising conduit means from the permeate side of the feed end of the second stage of the membrane dryer unit, and including conduit means for recycling purge and permeate gas from the first stage of the membrane dryer unit for introduction to the feed end of the first stage of the membrane dryer unit.

25. The system of claim 16 and including conduit means for passing a portion of the clean, dry air removed from the product end of the membrane dryer unit to the permeate side of said membrane dryer unit for use as purge gas therein.

26. The system of claim 16 in which the membrane dryer unit comprises hollow fibers having an impervious barrier on the longitudinal outer surface thereof such as to provide for said countercurrent flow pattern between the feed air and the permeate gas.

27. A system for the production of clean, dry air and nitrogen from feed air comprising:
(a) a membrane dryer unit capable of selectively permeating moisture present in feed air, said membrane dryer unit being characterized by a high separation factor for water/air and being adapted for a countercurrent flow pattern between the feed air and the permeate gas, with permeate gas flowing on the low pressure permeate side thereof generally parallel to the flow of wet feed air in the feed side thereof, said membrane dryer unit thereby being characterized by a significant degree of countercurrency of permeation;
(b) a two stage air separation membrane system capable of selectively permeating oxygen or nitrogen, as the more readily permeable component of air, from feed air, the membrane material therein being relatively insensitive to the presence of water vapor in feed air;
(c) conduit means for passing wet feed air to the feed end of the membrane dryer unit and to the feed end of the first stage of the air separation membrane system;
(d) conduit means for recovering clean, dry air from the product end of the membrane dryer unit as a clean, dry air product stream;
(e) conduit means for passing a partially purified nitrogen stream from the product end of the first stage of the air separation membrane system to the feed end of the second stage thereof;
(f) conduit means for discharging oxygen rich gas from the first stage of the air separation membrane system as a waste stream;
(g) conduit means for recovering a product nitrogen stream from the second stage of said air separation membrane system;
(h) conduit means for passing an oxygen-containing stream from the second stage of the air separation membrane system to the low pressure permeate side of the product end of said membrane dryer unit for use as purge gas therein; and
(i) conduit means for removing purge and permeate gas from the feed end of the membrane dryer unit, whereby such integrated membrane dryer unit and air separation membrane system enables both clean, dry air and nitrogen product streams to be efficiently obtained from feed air.

28. The system of claim 27 in which said air separation membrane system is adapted for the selective permeation of oxygen as the more readily permeable component of air, with nitrogen product being recovered as the less readily permeable component of air, said conduit means for discharging oxygen rich gas from the first stage of the air separation membrane system comprising conduit means for discharging said oxygen rich gas from the low pressure permeate side thereof, said conduit means for passing an oxygen-containing stream from the second stage of the air separation membrane system comprises conduit means from the low pressure permeate side of said second stage of the air separation membrane system, and said conduit means for recovering a product nitrogen stream comprises conduit means for recovering said product nitrogen stream as non-permeate gas from the product end of said second stage.

29. The system of claim 27 and including conduit means for recycling purge and permeate gas removed from the feed end of the membrane dryer unit for introduction to the feed end of said membrane dryer unit and to the first stage of the air separation membrane system with additional quantities of feed air.

30. The system of claim 27 in which the membrane dryer unit comprises hollow fibers having an impervious barrier on the longitudinal outer surface thereof such as to provide for said countercurrent flow pattern between the feed air and the bulk permeate gas.

* * * * *